Sept. 12, 1939.   H. G. WASSERLEIN, JR   2,172,487
LOAD COMPENSATED CONTROL SYSTEM
Filed Dec. 19, 1935
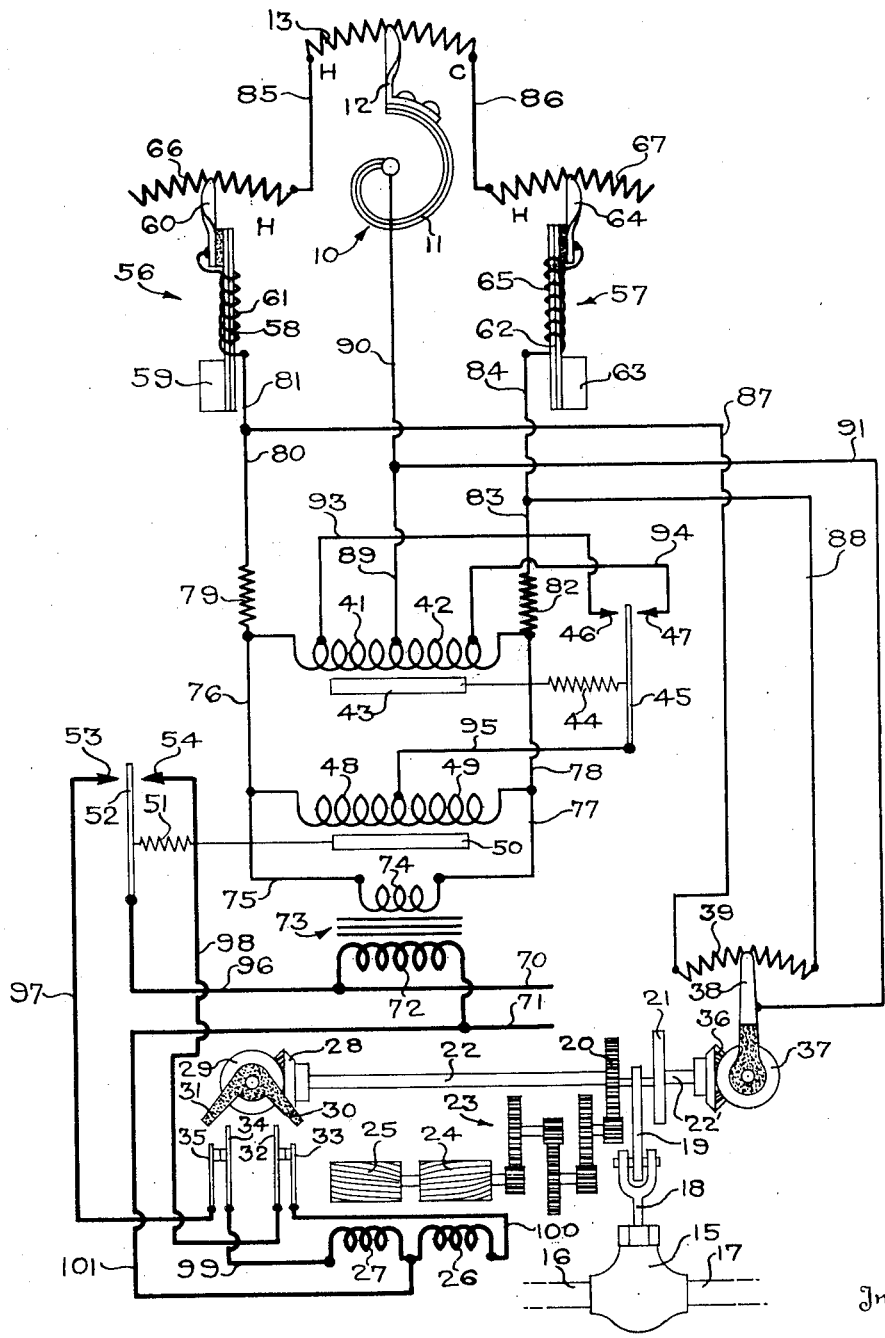
Inventor
Henry G. Wasserlein Jr.
By George H. Fisher
Attorney Patented Sept. 12, 1939

2,172,487

UNITED STATES PATENT OFFICE 2,172,487

LOAD COMPENSATED CONTROL SYSTEM

Henry G. Wasserlein, Jr., East Cleveland, Ohio, assignor to Minneapolis-Honeywell Regulator Company, Minneapolis, Minn., a corporation of Delaware Application December 19, 1935, Serial No. 55,216

16 Claims. (Cl. 236—74)

This invention relates to control systems of the type disclosed in application Ser. No. 673,236, filed by Lewis L. Cunningham on May 27, 1933. In the type of system disclosed in the above-referred to application, the condition being controlled is maintained within predetermined limits, the control point and consequently the value of the condition varying between these limits in accordance with the load on the system. When such a system is used, for example, as a temperature control system for a furnace, the control point and consequently the temperature of the furnace remains constant as long as the load on the furnace remains constant, but as the load on the furnace varies, the control point and consequently the temperature of the furnace varies within predetermined limits. Specifically, an increase in the load on the furnace causes a lowering of the control point and a decreasing of the temperature of the furnace, and vice versa, a decrease in the load on the furnace causes an increase in the temperature of the furnace and a raising of the control point. However, the control point and consequently the temperature of the furnace is maintained within the limits set for the control system.

In industrial processes, it is desirable to maintain conditions or temperatures substantially constant. If the differential of the system be decreased to maintain these conditions or temperatures substantially constant, "hunting" is likely to occur. This "hunting" may be eliminated by widening of the differential or control but this widening of the differential does not maintain accurately the temperature or condition at a substantially constant value.

It is therefore the prime object of this invention to provide a system utilizing a narrow differential of control whereby the temperature or conditions to be controlled may be maintained substantially constant and wherein "hunting" of the system is prevented.

In carrying out this object of the invention, I contemplate the use of changes in the current flow throughout the various connections in this system for compensating the control system of the above-referred to application whereby the control system may be operated within narrow differentials and whereby changes in load are compensated for so that "hunting" of the control system is prevented.

It is therefore an object of this invention to provide a compensated control system wherein changes in the current flow in such a control system is utilized for compensating changes in load to maintain a substantially constant condition without the occurrence of "hunting".

Other objects and advantages will become apparent to those skilled in the art upon reference to the accompanying specification, claims and drawing, in which drawing is diagrammatically illustrated the preferred form of my invention.

Although this invention is of general utility and may be utilized in any type of control system, I have shown it as a temperature control system, having a temperature responsive device generally designated at 10 for controlling or positioning a valve 15. For purposes of illustration, the valve 15 may be operated to control a supply fuel to an industrial furnace (not shown) and the temperature responsive device 10 may respond to the temperature within the furnace.

The temperature responsive device 10 is shown to comprise a bimetallic element 11, carrying slider 12 which is adapted to slide across a potentiometer coil 13. Upon an increase in furnace temperatures, the slider 12 is moved to the left with respect to the potentiometer coil 13 in the direction indicated by the character H. Upon a decrease in furnace temperature, the slider 12 is moved to the right with respect to the potentiometer coil 13 in the direction indicated by the character C.

The valve 15 is shown to control the supply of fuel from a supply pipe 16 to a pipe 17 leading to a burner in the furnace. The valve 15 may be operated by a proportioning motor of the type shown and described in the above referred to application but for purposes of illustration in this application, I have shown the valve 15 to be operated by a valve stem 18 which is connected by a pin to one end of a pitman 19. The other end of pitman 19 is connected to a crank pin carried by a gear 20 and a crank disc 21. The gear 20 may be mounted on a shaft 22 and the crank disc 21 may be mounted on a shaft 22'. The gear 20 is driven through a reduction gear train 23 by motor rotors 24 and 25, the motor rotors being controlled by field windings 26 and 27, respectively. The arrangement is such that when the field winding 26 is energized, the valve 15 is moved towards an open position and when the field winding 27 is energized, the valve 15 is moved towards a closed position.

The shaft 22 carries a bevelled gear 28 which meshes with another bevelled gear 29 which in turn carries abutment fingers 30 and 31. Upon extreme clockwise movement of the beveled gear 29, the abutment finger 30 is adapted to engage a contact 32 to break contact between the contact 32 and a contact 33. Likewise, upon extreme counterclockwise movement of bevelled gear 29, the abutment finger 31 is adapted to engage a contact 34 to break contact between the contact 34 and a contact 35. The contacts 32, 33, 34 and 35 form limit switches, the operation of which will be pointed out more fully hereafter. The shaft 22' carries a bevelled gear 36 which meshes with a bevelled gear 37 which in turn carries a slider 38. The slider 38 is adapted to slide across a potentiometer coil 39, the arrangement being such that when the valve 15 is moved towards an open position, the slider 38 is moved to the left with respect to the potentiometer coil 39 and when the valve 15 is moved towards a closed position, the slider 38 is moved towards the right.

Coils 41 and 42 control the operation of an armature 43 which is connected by means of a spring 44 to a pivoted switch arm 45. Switch arm 45 is adapted to engage spaced contacts 46 and 47, the arrangement being such that when the coil 41 is energized more than the coil 42, the switch arm 45 is moved into engagement with the contact 46 and when the coil 42 is energized more than the coil 41, the switch arm 45 is moved into engagement with the contact 47. When the coils 41 and 42 are equally energized, the switch arm 45 is maintained midway between the contacts 46 and 47 in the position shown in the drawing. This invention also contemplates the use of coils 48 and 49 which control the operation of an armature 50. The armature 50 is connected by a spring 51 to a pivoted switch arm 52 which is adapted to engage spaced contacts 53 and 54. When the coil 49 is energized more than the coil 48, the switch arm 52 is moved into engagement with the contact 54 and when the coil 48 is energized more than the coil 49, the switch arm 52 is moved into engagement with the contact 53. When the coils 48 and 49 are equally energized, the switch arm 52 is moved to a position midway between the contacts 53 and 54 in the position shown in the drawing.

This invention contemplates the use of compensators generally designated at 56 and 57. The compensator 56 is shown to comprise a bimetallic element 58 suitably mounted on a block 59. Suitably mounted on and insulated from the bimetallic element 58 is a slider 60 which is adapted to slide across a resistance 66. Located in close proximity to the bimetallic element 58 is a heater coil 61, the arrangement being such that when the heater coil 61 is energized, the bimetallic element 58 is flexed to move the slider 60 towards the right with respect to the resistance 66 in the direction indicated by the character H. The structure and mode of operation of compensator 57 is the same as that of 56 and comprises a bimetallic element 62, mounted on a block 63 and carrying, in an insulated manner, a slider 64 which is adapted to slide across a resistance 67. The bimetallic element 62 is likewise provided with an electric heating coil 65, the arrangement being such that upon energization of the electric heating element 65, the slider 64 is moved to the left with respect to the resistance 67 in the direction indicated by the character H. It is evident that some time will elapse before a change in the heating effect of the heater elements 61 and 65 is felt by the thermostatic elements 58 and 62. In other words, a time lag will be present between the change in current flow through the heater elements 61 and 65 and the movement of the sliders 60 and 64 with respect to their resistances 66 and 67.

Leading from some source of power (not shown) are line wires 70 and 71. A primary 72 of a step-down transformer 73, having a secondary 74 is connected across the line wires 70 and 71. One end of the secondary 74 is connected by wires 75 and 76 to the left-hand ends of coils 48 and 41. In a like manner, the right-hand end of secondary 74 is connected by wires 77 and 78 to the right-hand ends of coils 49 and 42. The adjacent ends of the coils 48 and 49 and the coils 41 and 42 are connected together. The left-hand end of coil 41 is connected by a protective resistance 79 and wires 80 and 81 to one end of heating coil 61 of the compensator 56. The other end of heating coil 61 is connected to the slider 60. In a like manner, the right-hand end of coil 42 is connected by a protective resistance 82 and wires 83 and 84 to one end of the heating coil 65 of the compensator 57. The other end of the heating coil 65 is connected to the slider 64. The resistance 66 associated with the compensator 56 is connected by a wire 85 to the left-hand end of potentiometer coil 13 and the resistance 67 associated with the compensator 57 is connected by a wire 86 to the right-hand end of potentiometer coil 13. The junction of wires 80 and 81 is connected by a wire 87 to the left-hand end of balancing potentiometer coil 39 and in a like manner, the junction of wires 83 and 84 is connected by a wire 88 to the right-hand end of the balancing potentiometer coil 39. The junction of coils 41 and 42 is connected by wires 89, 90 and 91 to the slider 12 associated with the potentiometer coil 13 and the slider 38 associated with the balancing potentiometer coil 39.

The contact 46 is connected by a wire 93 to a small number of turns of coil 41 and the contact 47 is connected by a wire 94 to a small number of turns of the coil 42. Switch arm 45 associated with the contacts 46 and 47 is connected by a wire 95 to the junction of coils 48 and 49. The switch arm 52 is connected by a wire 96 to the line wire 70 and the contact 53 cooperating with the switch arm 52 is connected by a wire 97 to the contact 35 of the limit switch. In a like manner, the contact 54 is connected by wire 98 to the contact 32 of the other limit switch. Contact 34 of the first limit switch is connected by a wire 99 to one end of field winding 27 and the contact 33 of the other limit switch is connected by a wire 100 to one end of field winding 26. The other ends of field windings 26 and 27 are connected together and by a wire 101 to the other line wire 71.

By reason of the above wiring connections, it is seen that the coils 41 and 42 and the coils 48 and 49 are connected across the secondary 74 by means of the wires 75, 76, 77 and 78. It is also seen that a shunt circuit for the coil 41 is provided by the protective resistance 79, the wires 80 and 81, the heating coil 61, slider 60, resistance 66, wire 85, potentiometer coil 13, slider 12 and wires 90 and 89. In a like manner, a shunt circuit is provided for the coil 42 by the protective resistance 82, wires 83 and 84, heating coil 65, slider 64, resistance 67, wire 86, potentiometer coil 13, slider 12 and wires 90 and 89. A second shunt circuit is provided for the coil 41 by the protective resistance 79, wires 80 and 87, balancing potentiometer coil 39, slider 38, and wires 91 and 89. Likewise, a second shunting circuit for the coil 42 is provided by the protective resistance 82, wires 83 and 88, balancing potentiometer coil 39, slider 38, and wires 91 and 89. It is also seen that when the switch arm 45 is moved into engagement with the contact 47, a shunt circuit for the coil 49 is provided through wire 78, a small number of turns of coil 42, wire 94, contact 47, switch arm 45 and wire 95. A shunt circuit for the coil 48 is provided when the switch arm 45 is moved into engagement with the contact 46 through wire 76, a small number of turns of coil 41, wire 93, contact 46, switch arm 45 and wire 95.

With the parts in the position shown in the drawing, the slider 12 is in the mid-position with respect to the potentiometer coil 13, the valve 15 is in mid-position and consequently the slider 38 is in the midposition with respect to the balancing potentiometer coil 39. Likewise, the sliders 60 and 64 are located in their mid positions with respect to their resistance coils 66 and 67. By reason of these mid positions, the flow of current through the above outlined shunt circuits for the coils 41 and 42 is equal and consequently, the coils 41 and 42 are equally energized to maintain the switch arm 45 in the mid position with respect to the contacts 46 and 47. With the switch arm 45 in this mid position, the shunt circuits for the coils 48 and 49 are broken and therefore the coils 48 and 49 are equally energized to maintain the switch arm 52 mid way between the contacts 53 and 54.

Omitting for the time being the action of compensators 56 and 57, upon movement of the slider 12 to the right with respect to the potentiometer coil 13 by reason of a decrease in furnace temperature, the flow of current through the shunt circuit for the coil 42 is increased, thereby decreasing the flow of current through the coil 42 to decrease the energization thereof. This right-hand movement of slider 12 also increases the resistance in the shunt circuit for the coil 41 to decrease the flow of current through this shunt circuit and thereby increase the flow of current through the coil 41. Therefore, by reason of the right-hand movement of slider 12, the coil 41 is energized more than the coil 42 and the switch arm 45 is moved into engagement with the contact 46. Movement of switch arm 45 into engagement with the contact 46 completes the shunt circuit for the coil 48 to decrease the flow of current through the coil 48 whereby the coil 49 is energized more than the coil 48. This unbalanced relationship of the coils 49 and 48 causes movement of switch arm 52 into engagement with th contact 54 to complete a circuit from the line wires 70 through wire 96, switch arm 52, contact 54, wire 98, limit switch contacts 32 and 33, wire 100, field winding 26 and wire 101, back to the other line wire 71. Completion of this circuit causes energization of field winding 26 to cause movement of valve 15 towards an open position.

Movement of the valve 15 towards an open position causes left-hand movement of slider 38 with respect to the balancing potentiometer coil 39. This left-hand movement of slider 38 decreases the resistance in the second shunt circuit for the coil 41 and increases the resistance in the second shunt circuit for the coil 42. Therefore, the current flow through the shunt circuit for the coil 41 is increased and the current flow through the coil 41 is decreased. Likewise, the current flow through the shunt circuit for the coil 42 is decreased and the current flow through the coil 42 is increased. By reason of this left hand movement of slider 38, the coil 42 is caused to be energized more than the coil 41, it being remembered that the coil 41 was energized more than the coil 42 by the right-hand movement of slider 12 with respect to the potentiometer coil 13. When the slider 38 has moved sufficiently far to the left with respect to the balancing potentiometer coil 39 so as to cause equal energization of coils 41 and 42, the switch arm 45 is moved out of engagement with the contact 46. This causes breaking of the shunt circuit for the coil 48 to cause equal energization of coils 48 and 49. This rebalancing of coils 48 and 49 causes movement of switch arm 52 out of engagement with contact 54 to break the circuit through the field winding 26 to stop further opening movement of the valve 15.

Upon an increase in temperature within the furnace, the slider 12 is moved to the left with respect to the potentiometer coil 13 to decrease the resistance in the shunt circuit for the coil 41 and thereby decrease the current flow through the coil 41 to give a consequent decrease in the energization thereof. Left-hand movement of slider 12 places more resistance in the shunt circuit for the coil 42 to decrease the flow of current through this shunt circuit and thereby increase the flow of current through the coil 42 to increase the energization thereof. By reason of this unbalanced relationship of coils 41 and 42, the switch arm 45 is moved into engagement with the contact 47 to complete the shunt circuit for the coil 49 to decrease the energization of coil 49. By reason of this unbalanced relationship of coils 40 and 49, the switch arm 52 is moved into engagement with the contact 53 to complete a circuit from the line wire 70 through wire 96, switch arm 52, contact 53, wire 97, contacts 35 and 34, wire 99, field winding 27 and wire 101 back to the other line wire 71. Completion of this circuit causes energization of field winding 27 to move the valve 15 towards a closed position.

Movement of valve 15 towards a closed position causes right-hand movement of slider 38 with respect to the balancing potentiometer coil 39. This right-hand movement increases the resistance in the second shunt circuit for the coil 41 to decrease the current flow through the shunt circuit and increase the current flow through the coil 41. This right-hand movement of slider 38 subtracts resistance from the shunt circuit for the coil 42 to increase the flow of current through the shunt circuit to decrease the flow of current through the coil 42. Therefore, the right hand movement of slider 38 increases the energization of coil 41 and decreases the energization of coil 42, it being remembered that the energization of coil 42 was increased with respect to the energization of coil 41 by the left-hand movement of slider 12 with respect to the potentiometer coil 13.

When the slider 38 has been moved sufficiently far to the right to rebalance the coils 41 and 42, the switch arm 45 is moved out of engagement with the contact 47 to break the shunt circuit for the coil 49 whereby the coils 48 and 49 again become equally energized. Due to this rebalancing of the coils 48 and 49, the switch arm 52 is moved out of engagement with switch arm 53 to the mid position shown in the drawing to break the circuit through the field winding 27 to prevent further closing movement of the valve 15.

In this manner, the valve 15 is caused to assume a position corresponding to the position of the slider 12 with respect to the potentiometer coil 13. Therefore, upon a decrease in furnace temperature, the valve 15 is moved towards an open position in a proportionate amount with respect to the decrease in furnace temperature to attempt to restore the furnace temperature back to normal. Likewise, an increase in furnace temperature causes a proportionate closing of the valve 15 in an attempt to restore the furnace temperature to normal.

If the parts be so adjusted that the slider 12 is maintained in a mid position with respect to the potentiometer coil 13 and the valve 15 maintained in a mid position for a given load condition in the furnace, a constant temperature may be maintained within the furnace as long as the load on the furnace remains constant. Movement of slider 12 to the right in response to a decrease in furnace temperature will cause opening movement of the valve 15 to restore the temperature to normal and when the temperature is restored to normal, the slider 12 will again assume the mid position. If however, the load on the furnace is increased so as to demand more heat to maintain a given temperature value, the valve 15 therefore should be opened further, and in order to maintain the valve 15 in this further open position, the slider 12 must assume a position to the right with respect to the mid position of the potentiometer coil 13. Therefore, the temperature within the furnace is not maintained at the desired value but at some value lower than the desired value, this decrease in the temperature maintained in the furnace being caused by the increased load on the furnace. In a like manner, a decrease in the load on the furnace will cause the existence of an increased temperature in the furnace slightly above the desired value. Therefore, with the system described immediately above, the temperature within the furnace cannot be maintained constant but can be maintained only within predetermined limits.

As pointed out above, if the limits are made sufficiently narrow to maintain a substantially constant temperature within the furnace, the system is liable to "hunt" and to decrease this "hunting" action of the system it has been in the past necessary to widen the differential of operation of the system. However, this widened differential of operation does not afford sufficiently accurate control when used in industrial processes.

In order to maintain a substantially constant temperature within the furnace and yet prevent "hunting", I have provided the compensators 56 and 57 in the first shunt circuits for the coils 41 and 42. Upon an increase in load on the furnace which causes a decrease in temperature, the slider 12 is moved to the right with respect to the potentiometer coil 13 to decrease the resistance in the shunt circuit for the coil 42 and to increase the resistance in the shunt circuit for the coil 41. This causes increasing of the energization of coil 41 and decreasing of the energization of the coil 42. Since the shunt circuit for the coil 42 passes through the heater 65 of the compensator 57 and since the current flow through this shunt circuit is increased by this right-hand movement of slider 12, the heating coil 65 is energized to a greater extent to cause flexing of the bimetal 62 to move the slider 64 to the left with respect to the resistance coil 67 to further reduce the resistance in the shunt circuit for the coil 42. By reason of this left-hand movement of slider 64, the energization of coil 42 is decreased further than if the compensator 57 were not contained in this shunt circuit. Likewise, the movement of slider 12 to the right with respect to the potentiometer coil 13 decreases the flow of current through the shunt circuit for the coil 41 to decrease the current flow through the heating coil 61 to allow the bimetallic element 58 to slide the slider 60 to the left with respect to the resistance 66. This left-hand movement of slider 60 by reason of the decreased current flow through the shunt circuit for the coil 41 adds more resistance to the shunt circuit to further decrease the current flow therethrough and thereby further increase the energization of the coil 41. Since the coil 41 is energized to a greater extent and the coil 42 is energized a lesser extent by reason of compensators 56 and 57, greater movement of valve 15 towards open position with consequent movement of slider 38 to the left with respect to the balancing potentiometer coil 39 is required to rebalance the coils 41 and 42. Therefore, with the slider 12 moved to a given position with respect to the potentiometer coil 13, the valve 15 is moved to a further open position to supply additional heat to the furnace. In this manner, as the slider 12 deviates from the center of potentiometer coil 13, the valve 12 is not moved exactly proportionate to the movement of slider 12 but moved to a greater extent and this greater movement of the valve 15 causes an increased supply of heat to the furnace to maintain the temperature of the furnace at the desired value regardless of the increase in load.

In a like manner, upon a decrease in load on the furnace, the slider 12 moves to the left with respect to the potentiometer coil 13 to increase the energization of coil 42 and decrease the energization of coil 41. By reason of the compensators 56 and 57 being located in the shunt circuits for the coils 41 and 42, the coil 42 is energized to a greater extent and the coil 41 is energized to a lesser extent than if the compensators 56 and 57 were not present. Therefore, upon a decrease in load on the furnace, the valve 15 is moved towards a closed position to supply less heat to the furnace whereby the furnace temperature is maintained at a substantially constant value regardless of the effects of this decrease in load on the furnace. As pointed out above the adjustment of the compensating resistances 66 and 67 lags somewhat behind the change in current flow through the heater elements 61 and 65 so that the additional positioning or resetting of the valve 15 is delayed somewhat and takes place rather gradually which effectively prevents "hunting". The amount and rate of additional positioning or resetting of the valve 15 is dependent upon how far the slider 12 of the control potentiometer deviates from the desired normal position. Accordingly, when the slider 12 of the control potentiometer deviates from the mid position shown, the valve 15 is moved quite rapidly a corresponding amount and then is subsequently gradually moved an additional amount, the rate and amount of additional movement of the valve 15 being dependent upon the amount of deviation of the slider 12 of the control potentiometer from the mid position.

From the above it is seen that I have provided a control system wherein changes in load conditions are compensated for to maintain the temperature or condition to be controlled at a substantially constant value and wherein "hunting" of such a control system is prevented.

Although I have disclosed one form of my invention, other forms thereof may become apparent to those skilled in the art and consequently this invention is to be limited only by the scope of the appended claims and prior art.

I claim as my invention:

1. In a temperature control system, the combination of temperature control means, means responsive to the temperature to be controlled, an adjustable potentiometer operated by said temperature responsive means, electric means in control of said temperature control means, connections between said adjustable potentiometer and said electric means, the arrangement being such that adjustment of said adjustable potentiometer by said temperature responsive means varies the current flow through said connections to adjust said temperature control means, variable resistance means in said connections, and thermo-electric means responsive to the current flow through said connections for adjusting said variable resistance means whereby the temperature control means is adjusted with respect to said adjustable potentiometer.

2. In a control system, the combination of means for controlling a condition, means responsive to the condition to be controlled, variable resistance means operated by said condition responsive means, electric means in control of said condition controlling means, connections between said variable resistance means and said electric means, the arrangement being such that operation of said variable resistance means by said condition responsive means varies the current flow through said connections to adjust said condition controlling means, variable resistance means in said connections, thermostatic means for operating said last mentioned variable resistance means, and heating means also in said connections for operating said thermostatic means, said heating means being variably energized in accordance with the current flow through said connections to vary the current flow therethrough whereby said condition controlling means is adjusted with respect to said first mentioned variable resistance means.

3. In a control system, the combination of means for controlling a condition, electric means for operating said condition controlling means, current controlling means connected to said electric means and responsive to the condition to be controlled for varying the current flow to said electric means, the arrangement being such that the condition to be controlled is maintained within predetermined limits, and thermo-electric means responsive to the current flow to said electric means for additionally varying the current flow to said electric means whereby said condition to be controlled is maintained within narrower limits.

4. In a control system, the combination of means for controlling a condition, electric means for operating said condition controlling means, current controlling means operated in response to changes in the condition to be controlled and connected to said electric means for varying the current flow to said electric means, the arrangement being such that the operation of said condition controlling means is varied in accordance with changes in the condition being controlled to maintain the condition to be controlled within predetermined limits, and thermo-electric means responsive to the current flow to the electric means for controlling the electric means to maintain the condition to be controlled within narrower limits.

5. In combination, a device to be positioned in a plurality of positions to control the value of a condition, electrical resistance means varied in accordance with changes in the value of the condition to be controlled and having a desired resistance value corresponding to a desired normal value of the condition, electrical relay means in control of said device, follow up means for said relay means operated by said device, connections between said relay means and said resistance means, said resistance means varying the current flow through said connections to operate said relay means for positioning said device in accordance with changes in the resistance value of the resistance means whereby the value of the condition to be controlled is maintained within certain limits, and means responsive to the current flow through said connections additionally to position said device for causing said device to assume a different position with respect to the resistance value of the resistance means to maintain the condition to be controlled within narrower limits.

6. In combination, a device to be positioned in a plurality of positions to control the value of a condition, electrical resistance means varied in accordance with changes in the value of the condition to be controlled and having a desired resistance value corresponding to a desired normal value of the condition, electrical relay means in control of said device, follow up means for said relay means operated by said device, connections between said relay means and said resistance means, said resistance means varying the current flow through said connections to operate said relay means for positioning said device in accordance with changes in the resistance value of the resistance means whereby the value of the condition to be controlled is maintained within certain limits, and means responsive to the current flow through said connections for also operating said relay means additionally to position said device for causing said device to assume a different position with respect to the resistance value of the resistance means to maintain the condition to be controlled within narrower limits.

7. In combination, a device to be positioned in a plurality of positions to control the value of a condition, electrical resistance means varied in accordance with changes in the value of the condition to be controlled and having a desired resistance value corresponding to a desired normal value of the condition, electrical relay means in control of said device, follow up means for said relay means operated by said device, connections between said relay means and said resistance means, said resistance means varying the current flow through said connections to operate said relay means for positioning said device in accordance with changes in the resistance value of the resistance means whereby the value of the condition to be controlled is maintained within certain limits, and thermo-electric means responsive to the current flow through said connections for also operating said relay means additionally to position said device.

8. In combination, a device to be positioned in a plurality of positions to control the value of a condition, electrical control resistance means varied in accordance with changes in the value of the condition to be controlled and having a desired resistance value corresponding to a desired normal value of the condition, electrical relay means in control of said device, follow up means for said relay means operated by said device, connections between said relay means and said resistance means, said resistance means varying the current flow through said connections to operate said relay means for positioning said device in accordance with changes in the resistance value of the control resistance means whereby the value of the condition to be controlled is maintained within certain limits, other variable resistance means associated with said relay means for operating also said relay means, and means responsive to the current flow through said connections for operating said variable resistance means additionally to position said device for causing said device to assume a different position with respect to the resistance value of the control resistance means to maintain the condition to be controlled within narrower limits.

9. In combination, a device to be positioned in a plurality of positions to control the value of a condition, electrical resistance means varied in accordance with changes in the value of the condition to be controlled and having a desired resistance value corresponding to a desired normal value of the condition, electrical relay means in control of said device, follow up means for said relay means operated by said device, connections between said relay means and said resistance means, said resistance means varying the current flow through said connections to operate said relay means for positioning said device in accordance with changes in the resistance value of the resistance means whereby the value of the condition to be controlled is maintained within certain limits, other variable resistance means associated with said relay means for operating also said relay means, and thermo-electric means responsive to the current flow through said connections for operating said variable resistance means additionally to position said device.

10. In combination, a device to be positioned in a plurality of positions to control the value of a condition, control electrical resistance means varied in accordance with changes in the value of the condition to be controlled and having a desired resistance value corresponding to a desired normal value of the condition, electrical relay means in control of said device, balancing electrical resistance means operated by said device, connections between said control resistance means, said balancing resistance means and said relay means, said resistance means varying the current flow through said connections to operate said relay means for positioning said device in accordance with changes in the condition to be controlled whereby the condition to be controlled is maintained within certain limits, and means responsive to the current flow through said connections additionally to position said device for causing said device to assume a different position with respect to the resistance value of the resistance means to maintain the condition to be controlled within narrower limits.

11. In combination, a device to be postioned in a plurality of positions to control the value of a condition, control electrical resistance means varied in accordance with changes in the value of the condition to be controlled and having a desired resistance value corresponding to a desired normal value of the condition, electrical relay means in control of said device, balancing electrical resistance means operated by said device, connections between said control resistance means, said balancing resistance means and said relay means, said resistance means varying the current flow through said connections to operate said relay means for positioning said device in accordance with changes in the condition to be controlled whereby the condition to be controlled is maintained within certain limits, and means responsive to the current flow through said connections for also operating said relay means additionally to position said device for causing said device to assume a different position with respect to the resistance value of the resistance means to maintain the condition to be controlled within narrower limits.

12. In combination, a device to be positioned in a plurality of positions to control the value of a condition, control electrical resistance means varied in accordance with changes in the value of the condition to be controlled and having a desired resistance value corresponding to a desired normal value of the condition, electrical relay means in control of said device, balancing electrical resistance means operated by said device, connections between said control resistance means, said balancing resistance means and said relay means, said resistance means varying the current flow through said connections to operate said relay means for positioning said device in accordance with changes in the condition to be controlled whereby the condition to be controlled is maintained within certain limits, other variable resistance means associated with said relay means for operating also said relay means, and means responsive to the current flow through said connections for operating said variable resistance means additionally to position said device for causing said device to assume a different position with respect to the resistance value of the control resistance means to maintain the condition to be controlled within narrower limits.

13. In combination, a device to be positioned in a plurality of positions to control the value of a condition, control electrical resistance means varied in accordance with changes in the value of the condition to be controlled and having a desired resistance value corresponding to a desired normal value of the condition, electrical relay means in control of said device, balancing electrical resistance means operated by said device, connections between said control resistance means, said balancing resistance means and said relay means, said resistance means varying the current flow through said connections to operate said relay means for positioning said device in accordance with changes in the condition to be controlled whereby the condition to be controlled is maintained within certain limits, other variable resistance means associated with said relay means for operating also said relay means, and thermo-electric means responsive to the current flow through said connections for operating said variable resistance means additionally to position said device.

14. In combination, a device to be positioned in a plurality of positions to control the value of a condition, a control potentiometer adjusted in accordance with changes in the value of the condition to be controlled and having a desired adjustment corresponding to the desired normal value of the condition, a normally balanced relay including series connected relay coils in control of said device, connections between said relay coils and said control potentiometer, said control potentiometer varying the current flow through said connections to unbalance said relay for positioning said device in accordance with the adjustment of the control potentiometer whereby the condition to be controlled is maintained within certain limits, and means responsive to the current flow through said connections additionally to position said device.

15. In combination, a device to be positioned in a plurality of positions to control the value of a condition, a control potentiometer adjusted in accordance with changes in the value of the condition to be controlled and having a desired adjustment corresponding to the desired normal value of the condition, a normally balanced relay including series connected relay coils in control of said device, connections between said relay coils and said control potentiometer, said control potentiometer varying the current flow through said connections to unbalance said relay for positioning said device in accordance with the adjustment of the control potentiometer whereby the condition to be controlled is maintained within certain limits, and means responsive to the current flow through said connections for also unbalancing said relay means additionally to position said device.

16. In combination, a device to be positioned in a plurality of positions to control the value of a condition, a control potentiometer adjusted in accordance with changes in the value of the condition to be controlled and having a desired adjustment corresponding to the desired normal value of the condition, a normally balanced relay including series connected relay coils in control of said device, connections between said relay coil and said control potentiometer, said control potentiometer varying the current flow through said connections to unbalance said relay for positioning said device in accordance with the adjustment of the control potentiometer whereby the condition to be controlled is maintained within certain limits, variable resistance means associated with said relay coils for unbalancing said relay, and means responsive to the current flow through said connections for operating said variable resistance means additionally to position said device.

HENRY G. WASSERLEIN, Jr.